US011237340B2

(12) United States Patent
Ma et al.

(10) Patent No.: US 11,237,340 B2
(45) Date of Patent: Feb. 1, 2022

(54) OPTICAL CONNECTORS AND OPTICAL FERRULES

(71) Applicant: 3M INNOVATIVE PROPERTIES COMPANY, St. Paul, MN (US)

(72) Inventors: Changbao Ma, Austin, TX (US); Alexander W. Barr, Austin, TX (US); Daniel F. Cronch, Denver, CO (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/822,269

(22) Filed: Mar. 18, 2020

(65) Prior Publication Data

US 2020/0310040 A1 Oct. 1, 2020

Related U.S. Application Data

(60) Provisional application No. 62/825,300, filed on Mar. 28, 2019.

(51) Int. Cl.
*G02B 6/38* (2006.01)

(52) U.S. Cl.
CPC ......... *G02B 6/3825* (2013.01); *G02B 6/3829* (2013.01)

(58) Field of Classification Search
CPC .................................................... G02B 6/3829
See application file for complete search history.

(56) References Cited

U.S. PATENT DOCUMENTS

| 2009/0252455 A1* | 10/2009 | Ohta | G02B 6/4214 385/42 |
| 2013/0272666 A1* | 10/2013 | Qi | G02B 6/3839 385/93 |
| 2017/0059785 A1* | 3/2017 | Smith | G02B 6/383 |

FOREIGN PATENT DOCUMENTS

| CN | 103189772 | 7/2013 | |
| CN | 105824081 | 8/2016 | |
| WO | WO-2017065999 A2 * | 4/2017 | ............... G02B 6/30 |

* cited by examiner

*Primary Examiner* — Omar R Rojas
(74) *Attorney, Agent, or Firm* — Jonathan L. Tolstedt

(57) ABSTRACT

An optical connector includes a housing having a resilient member and an optical ferrule. The optical ferrule includes a plurality of attachment areas for receiving and securing a plurality of optical waveguides and a light redirecting side for changing a direction of light received from an optical waveguide. The optical connector is configured such that when an optical waveguide is received and secured in any of the attachment areas and light from the optical waveguide propagates along an optical path, the resilient member is not in the optical path. When the optical ferrule mates with a mating optical ferule, the resilient member is resiliently deformed to resiliently force the optical ferrule against the mating optical ferrule.

10 Claims, 3 Drawing Sheets

OPTICAL CONNECTORS AND OPTICAL FERRULES

TECHNICAL FIELD

This disclosure relates generally to optical connector assemblies and optical ferrules.

BACKGROUND

Optical connectors can be used for optical communications in a variety of applications including telecommunications networks, local area networks, data center links, and internal links in computer devices. Optical communication can also be extended to applications inside smaller consumer electronic appliances such as laptops and cell phones. With the miniaturization of optical modules and optical fiber devices, optical fiber congestion can occur at optical interfaces and connection distribution points.

SUMMARY

Various aspects and embodiments described herein relate to optical connectors and optical ferrules.

Some embodiments include an optical connector including a housing having a resilient member. The optical connector includes an optical ferrule assembled to the housing. The optical ferrule includes a plurality of attachment areas for receiving and securing a plurality of optical waveguides. The optical ferrule further includes a light redirecting side for changing a direction of light received from an optical waveguide received and secured in an attachment area. The optical connector is configured such that when an optical waveguide is received and secured in any of the attachment areas and light from the optical waveguide propagates along an optical path, the resilient member is not in the optical path. Further, when the optical connector mates with an optical mating connector having an optical mating ferrule assembled thereto, and the optical ferrule mates with the mating optical ferule, the resilient member is resiliently deformed to resiliently force the optical ferrule against the mating optical ferrule.

In some embodiments, an optical connector includes a resilient member; and an optical ferrule. The optical ferrule includes an attachment area for receiving and securing an optical waveguide. The optical ferrule further includes a light redirecting side for changing a direction of light received from an optical waveguide received and secured in the attachment area. The optical connector is configured such that the light propagating along an optical path does not intersect the resilient member. When the optical ferrule mates with an optical mating ferrule along a mating direction, the resilient member is resiliently deformed to produce a resilient force urging the optical ferrule against the mating optical ferrule along a first direction making an oblique angle with the mating direction.

Other aspects of the disclosure relate to an optical connector including an optical ferrule for mating with a mating optical ferrule along a mating direction and for directing light received from an optical waveguide along an optical path. The optical connector is configured such that at least a portion of the optical path along a first direction is different from the mating direction. The optical connector includes a spring member for resiliently forcing the optical ferrule against the mating optical ferrule along a second direction different from the mating direction and the first direction.

Another aspect of the disclosure relates to an optical ferrule including a plurality of attachment areas for receiving and securing a plurality of optical waveguides. The optical ferrule further includes a light redirecting side for changing a direction of light received from an optical waveguide received and secured in an attachment area by at least 45 degrees. The optical ferrule includes opposing first and second arms integrally formed with, and extending from, opposing respective first and second sides of the optical ferrule in a direction substantially perpendicular to the respective first and second sides and the mating direction of the optical ferrule.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows an optical connector with an optical ferrule in accordance with some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

Optical connectors can be used to connect multi-fiber ribbon cables, for example. A ribbon cable typically includes a plurality of optical fibers organized and molded side by side in a plastic ribbon. An optical connector may include an optical ferrule configured to receive optical fibers from a ribbon cable. Two mating optical ferrules with the same fiber spacing may be placed in an abutting relationship so that the ends of the fibers of the respective ferrules are substantially co-axially aligned with one another, thereby forming a multi-fiber connection. Mating of optical ferrules can utilize constant forward and normal forces that can be directly or indirectly applied to the ferrules. Bending of the multi-fiber ribbons can be used to provide the desired forward and normal forces to keep the ferrules mated to each other. However, bending of the fibers may create stress over time in the fibers themselves and in the bonding between the fibers and the ferrule. In some embodiments of the present disclosure, optical ferrules and/or optical connectors include features than generate the desired forward and normal forces substantially without using bending of the optical fibers to produce the desired forces.

Optical connectors including expanded beam optical connectors may include optical ferrules (also known as "light coupling units") that may be formed as unitary, molded structures. A unitary optical ferrule is a single piece structure that includes one or more elements for receiving and securing a waveguide, one or more elements for affecting light from the waveguide, and one or more alignment features. Optical connectors described herein include one or more optical cable assemblies disposed in a housing. The optical cable assemblies may include one waveguide or arrays of multiple parallel waveguides (typically 4, 8 or 12 or more parallel waveguides) attached to one or more optical ferrules.

Figure 1:
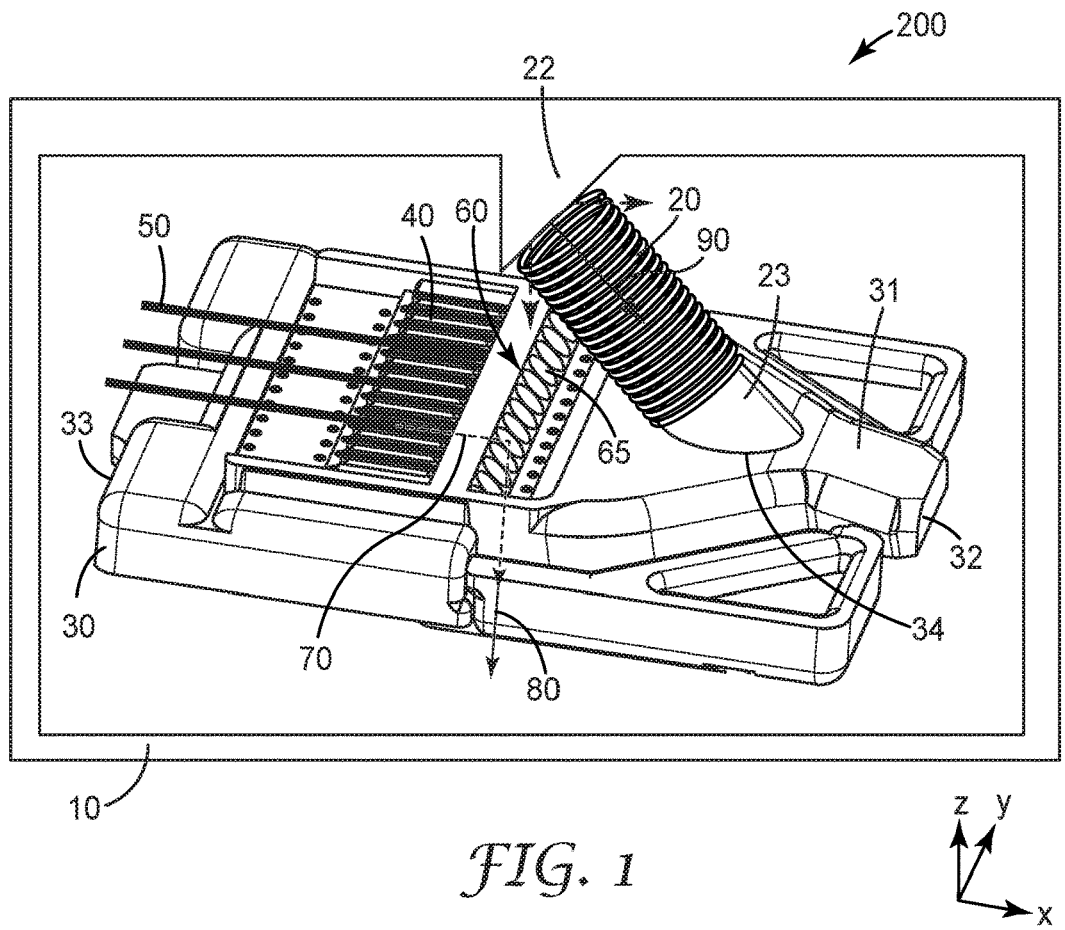
Figure 2:
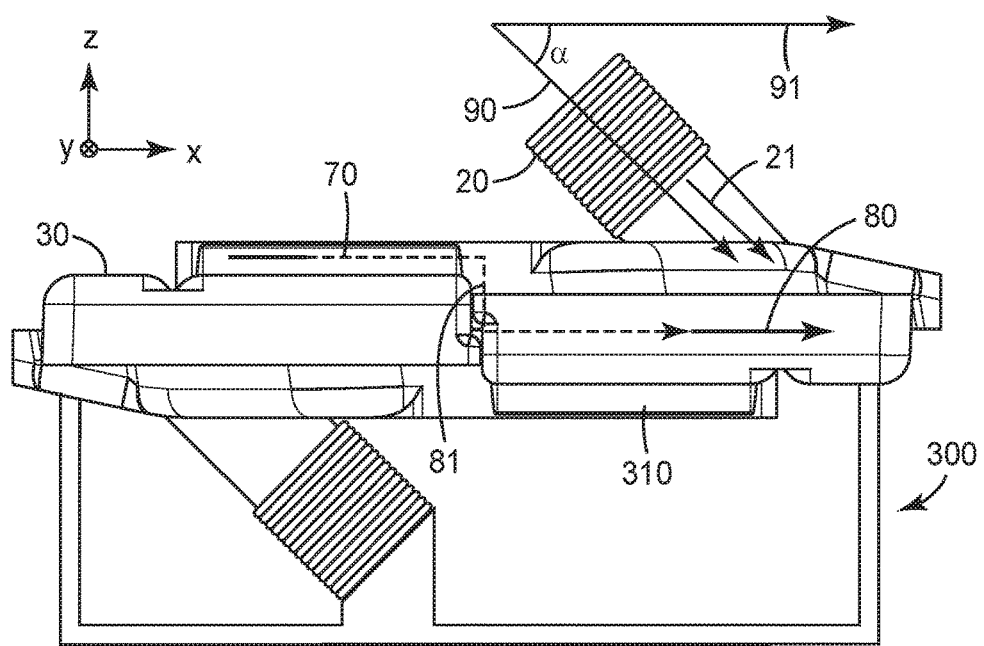
FIG. 2 schematically shows a side view of an optical ferrule mated with an optical mating ferrule according to certain aspects of the disclosure.

In some embodiments, illustrated in FIGS. 1 and 2 an optical connector 200 includes an optical ferrule 30 for mating with a mating optical ferrule 310 along a mating direction 91. In some aspects, the optical ferrules 30, 310 may have a unitary construction. In other aspects, the optical ferrule may be a ferrule that includes pieces formed separately and adhered or otherwise fastened together. The ferrule may be made from any suitable materials including polymers or ceramics. The ferrule may include one or more elements that guide or help guide the ferrule and a mating ferrule into alignment when the two ferrules are mated.

In some embodiments, the optical ferrule 30 directs light 70 received from an optical waveguide 50 along an optical path 80. At least a portion 81 of the optical path is along a first direction (z-axis) different from the mating direction 91. The optical ferrule 30 includes a resilient member, for example, a spring member 20, for resiliently forcing the optical ferrule 30 against the mating optical ferrule 310 along a second direction 90 different from the mating direction 91 and first direction (z-axis).

In some embodiments as illustrated in FIGS. 1 and 2 an optical connector includes a housing 10 and an optical ferrule 30 assembled to the housing 10. The housing 10 may function to prevent dirt from interfering with optical connections, for example. The housing may provide retention force to maintain the ferrules in positive contact, as well as a latching and release mechanism for mating and de-mating the connector. In addition, the housing can protect an optical ferrule from outputting stray light that can be a safety hazard to those nearby. In some embodiments, the housing may have a latching mechanism to prevent its accidental opening. In some embodiments, the housing may have a door mechanism that may be opened by the action of mating two connectors. The housing can have any suitable configuration for holding and securing the optical ferrule and for mating the optical connector to the mating optical connector.

The optical connector includes optical cables disposed within the housing 10. Each optical cable may include a waveguide array having one or more optical waveguides 50. The term optical waveguide is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross sectional shape, e.g., circular, square, rectangular etc. The individual waveguides in the waveguide array may be optical fibers made of glass with a protective buffer coating. Multiple parallel waveguides of a waveguide array may be enclosed by a jacket.

According to an embodiment, the optical ferrule 30 includes a plurality of attachment areas 40 for receiving and securing a plurality of optical waveguides 50. Each attachment area 40 extends along a first direction (x-axis) as shown in FIG. 1. The optical waveguides 50 according to some embodiments may be optical fibers, and may be aligned in grooves provided in the attachment areas 40 to which they are permanently attached. At the point of attachment, the fiber buffer coating and protective jacket (if any) of the waveguides 50 are stripped away to allow only the bare optical fibers to lie aligned and permanently affixed to the grooves in the attachment areas 40. The ferrule 30 also includes a light redirecting side 60 for changing a direction of light 70 received from the optical waveguide 50 received and secured in an attachment area. In some aspects, the light redirecting side 60 is configured to change the direction of light 70 received from the optical waveguide 50 received and secured in the attachment area 40 by at least 45 degrees, or at least about 60 degrees. In some embodiments, the ferrule 30 includes an array of light redirecting elements 65 in the light redirecting side 60, at least one for each optical waveguide 50 in the waveguide array attached to ferrule 30. The exit ends of optical waveguides 50 are situated so as to be able to direct light 70 emanating from each optical waveguide 50 in the optical waveguide array into the input side or face of a corresponding light redirecting element 65 in the light redirecting side 60 of the ferrule 30. For example, in various embodiments, each light redirecting element 65 in the light redirecting side 60 has one or more of a prism, a lens, and a reflecting surface.

In some embodiments, the light redirecting side 60 is configured to change the direction of the light 70 received from an optical waveguide 50 received and secured in the attachment area 40 from a first direction (x-axis) to a substantially perpendicular second direction (z-axis) as illustrated more clearly in FIG. 2. In some other aspects, the light redirecting side 60 is configured to change the direction of the light 70 received from an optical waveguide 50 received and secured in an attachment area 40 primarily by total internal reflection (TIR). In some embodiments, the light redirecting elements 65 in the light redirection side 60 may include a reflective coating, for example, or otherwise be made reflective.

As illustrated in FIGS. 1 and 2, the housing 10 includes a resilient member 20. In some embodiments, the resilient member extends along a first direction 90 and is attached to a first coupling end 22 attached to the housing 10 and to an opposite second coupling end 23 for making contact with the optical ferrule 30. In some aspects of the disclosure, when an optical waveguide 50 is received and secured in any of the attachment areas 40 and light 70 from the optical waveguide 50 propagates along an optical path 80, the resilient member 20 is not in the optical path 80. Further, when the optical connector 200 mates with an optical mating connector 300 including an optical mating ferrule 310 assembled thereto, and the optical ferrule 30 mates with the mating optical ferule 310, the resilient member 20 is resiliently deformed to resiliently force the optical ferrule 30 against the mating optical ferrule 310. In some embodiments, when the optical ferrule 30 mates with the mating optical ferule 310, the resilient member 20 is resiliently deformed along the first direction 90.

In some embodiments, the resilient member 20 includes a spring. In some other embodiments, the resilient member may be elastic materials such as rubbers, or magnetic elements, or electrostatic elements, etc. In some embodiments, the resiliently deformed resilient member makes contact with, and applies the force to, a top major surface 31 of the optical ferrule 30. In some aspects, the optical ferrule 30 includes a mating end 32 and an opposite rear end 33. The resiliently deformed resilient member 20 makes contact with, and applies the force to, a region 34 of the optical ferrule disposed between the light redirecting side 60 and the mating end 32 of the optical ferrule.

The resiliently deformed resilient member 20 applies the resilient force to the optical ferule 30 along the first direction 90 making an oblique angle (α) with a mating direction 91 of the optical ferule 30. The mating direction 91 of a ferrule refers to a direction along which a ferrule is adapted to be moved in order to mate with a mating ferrule. According to the Cartesian coordinate system shown in FIG. 2, the mating direction 91 extends in the x-axis. In some embodiments, the oblique angle (α) made with the mating direction of the optical ferrule 30 may be about 20 degrees to about 70 degrees. In some other embodiments, the oblique angle (α) may be between about 30 degrees to about 60 degrees, or between 50 degrees to 65 degrees.

In other aspects, each attachment area 40 extends along a first direction (x-axis), and the resiliently deformed resilient member 20 is configured to apply the resilient force to the optical ferule 30 along a second direction 90 making an oblique angle (α) with the first direction. In some embodiments, the oblique angle (α) made with the first direction (x-axis) may be about 20 degrees to about 70 degrees. In some other embodiments, the oblique angle (α) may be between about 30 degrees to about 60 degrees, or between 50 degrees to 65 degrees.

In some embodiments, a ferrule may have more than one mating direction. For example, in some embodiments the ferrule may be adapted to be moved along a first mating direction, or along a second orthogonal mating direction, or along a vector sum of the first and second mating directions relative to a mating ferrule in order to mate with the mating ferrule.

In some embodiments, at least 30% of the resilient force is along the mating direction 91, and at least 30% of the resilient force is along a direction orthogonal to the mating direction. In some embodiments, the resilient force along a mating direction 91, in a 12-fiber ferrule, for example, may be around 0.4-0.6 N (or 50 grams force), or 0.45-0.55 N. The resilient force may be roughly proportional to the number of fibers in the ferrule.

Figure 3:
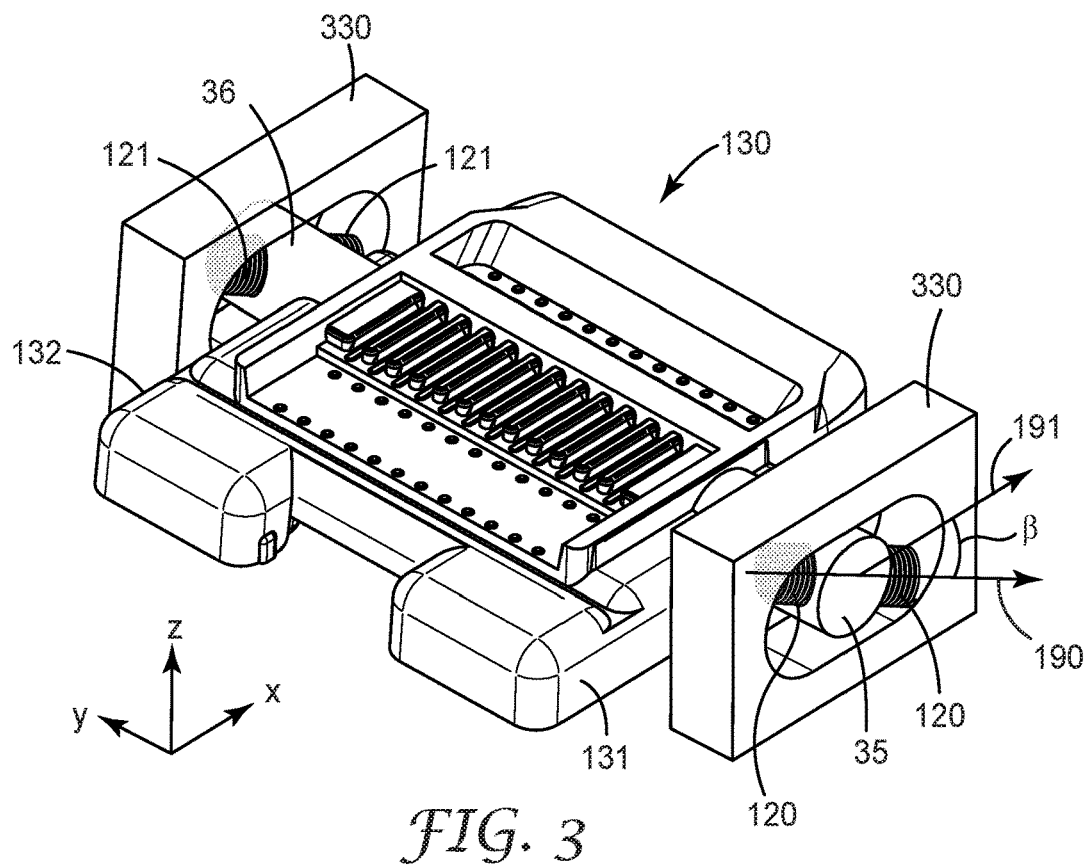
FIG. 3 schematically shows an optical ferrule in contact with housing of an optical connector according to certain aspects of the disclosure.

In some embodiments, the optical ferrule may include one or more flexible arms that guide or help guide the optical ferrule and a mating optical ferrule into alignment when the two ferrules are mated. In some embodiments, first and second arms may have the same flexing properties (e.g., the same modulus and the same geometry). According to an aspect of the disclosure as best seen in FIG. 3, the resiliently deformed resilient member 120 makes contact with, and applies the force to, a first arm 35 of the optical ferrule 130. The first arm 35 is integrally formed with, and extends from, a first side 131 of the optical ferrule 130 in a direction (y-axis) substantially perpendicular to the first side 131 and a mating direction (x-axis) of the optical ferrule 130.

In other embodiments, the optical ferrule 130 includes opposing first 35 and second 36 arms integrally formed with, and extending from, opposing respective first 131 and second 132 sides of the optical ferrule in a direction (y-axis) substantially perpendicular to the respective first and second sides and a mating direction (x-axis) of the optical ferrule.

In some embodiments, the optical connector 200 includes a pair of first resilient members 120 contacting the first arm 35 and a pair of second resilient members 121 contacting the second arm 36. When the optical connector 200 mates with an optical mating connector 300 having a mating optical ferrule 310 assembled thereto, and the optical ferrule mates with the mating optical ferule, at least one first resilient member 120 and at least one second resilient member 121 are resiliently deformed to resiliently force the optical ferrule 130 against the mating optical ferrule 310. In some other aspects, when the optical ferrule 30 mates with the mating optical ferule 310, at least one first resilient member 120 and at least one second resilient member 121 are resiliently deformed to produce resilient forces urging the optical ferrule 130 against the mating optical ferrule 310 along the first direction 90.

In some aspects, one or more of the pairs of first and second resilient members 20 include a spring. In some other embodiments, the one or more of the pairs of first and second resilient members may be elastic materials such as rubbers, or magnetic elements, or electrostatic elements, etc.

Figure 4A:
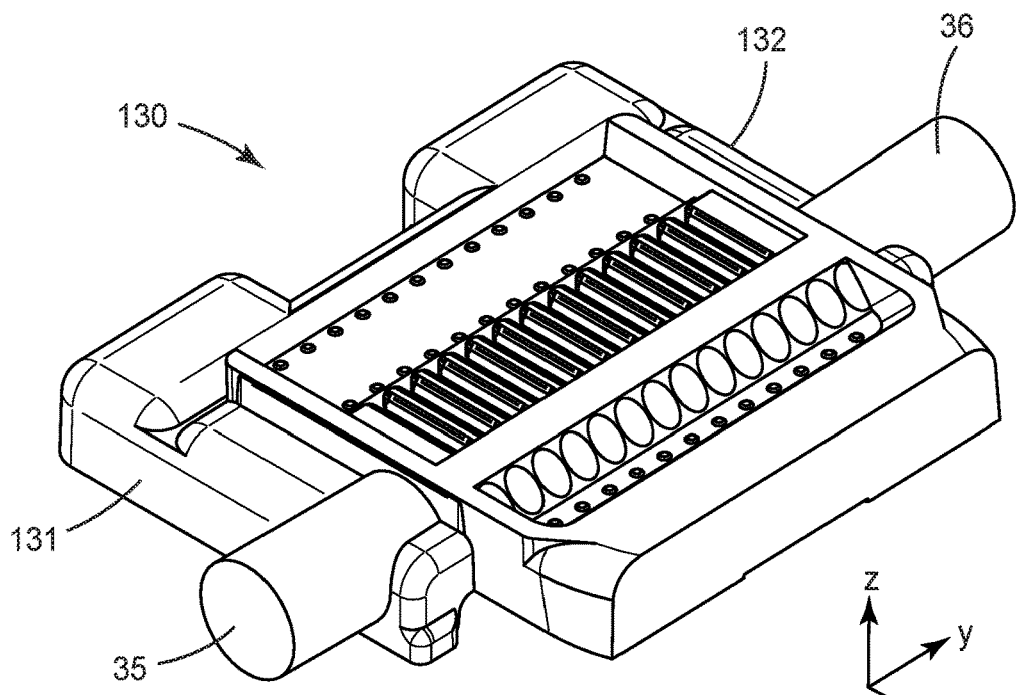
FIGS. 4A-4C schematically show different embodiments of the optical ferrule according to the disclosure.
Figure 4B:
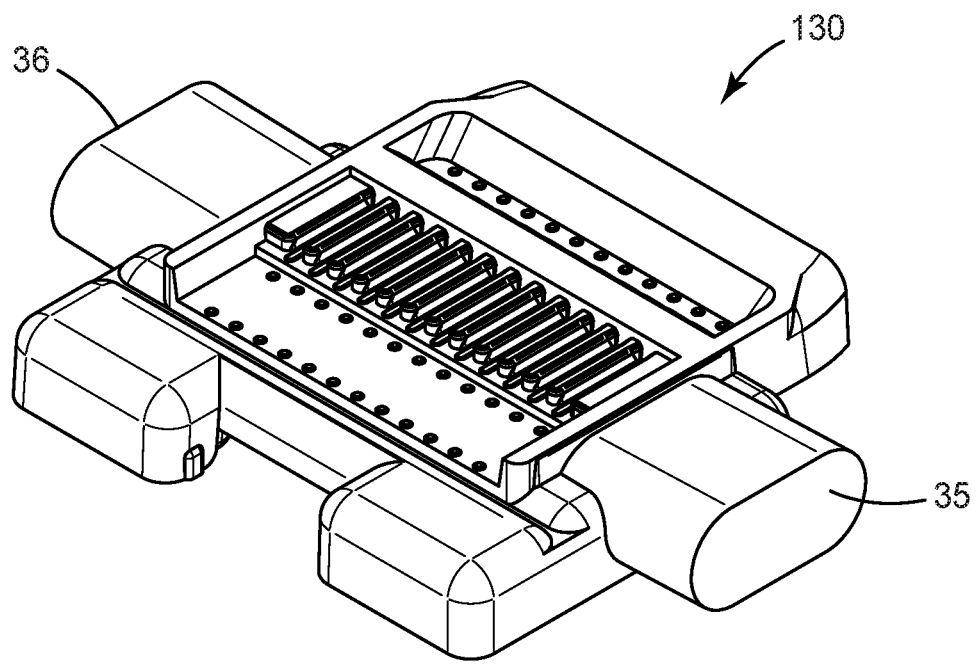
Figure 4C:
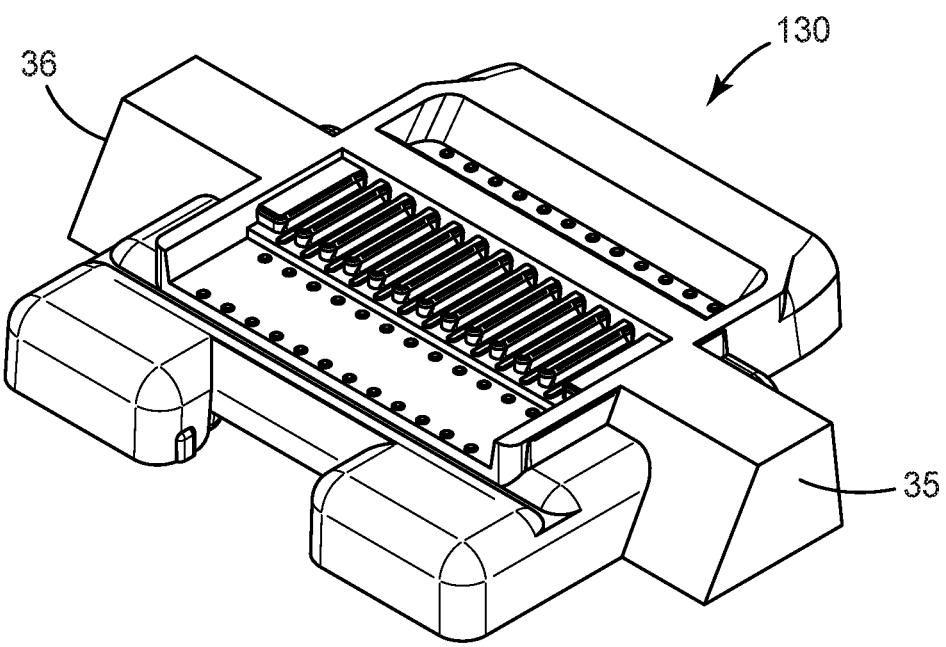

In some aspects, each of the first and second arms may have a circular cross-section as shown in FIG. 4A. In other aspects, each of the first and second arms may have an oval cross-section as shown in FIG. 4B, In some other aspects, each of the first and second arms may have a trapezoidal cross-section as shown in FIG. 4C. Various other shapes of the first and second arms are also within the scope of this disclosure. Resilient members may make contact with the arms on one or both sides of the arms to provide the forward and normal forces desired for mating the optical ferrule with a mating optical ferrule.

In some aspects, the first resilient members 120 contact opposite sides of the first arm 35, and the second resilient members 121 contact opposite sides of the second arm 36. In other aspects, for each of the first and second resilient members 120, 121, one end of the resilient member makes contact with the respective arm of the ferrule 130, and an opposing end of the resilient member makes contact with the housing 330 of the optical connector.

In some aspects, the resiliently deformed resilient member 120, 121 applies the resilient force to the optical ferule 130 along a first direction 190 making an oblique angle (β) with a mating direction 191 of the optical ferule 130. In some embodiments, the oblique angle (β) made with the mating direction 191 may be about 20 degrees to about 70 degrees. In some other embodiments, the oblique angle (β) may be between about 30 degrees to about 60 degrees, or between 50 degrees to 65 degrees. In some aspects, at least 30% of the resilient force is along the mating direction 191, and at least 30% of the resilient force is along a direction orthogonal to the mating direction. In some aspects, the resilient force along a mating direction 191, in a 12-fiber ferrule, for example, may be around 0.4-0.6 N (or 50 grams force), or 0.45-0.55 N. The resilient force may be roughly proportional to the number of fibers in the ferrule.

In other embodiments of the disclosure as more clearly illustrated in FIG. 2, an optical connector 200 includes a resilient member 20 and an optical ferrule 30. The optical ferrule 30 includes an attachment area 40 for receiving and securing an optical waveguide 50 as seen in FIG. 1. The optical ferrule 30 includes a light redirecting side 60, as described elsewhere in this disclosure, for changing a direction of light 70 received from the optical waveguide 50 received and secured in the attachment area 40, the light 70 propagating along an optical path 80 not intersecting the resilient member 20. When the optical ferrule 30 mates with an optical mating ferrule 310 along a mating direction 91, the resilient member 20 is resiliently deformed to produce a resilient force 21 urging the optical ferrule 30 against the mating optical ferrule 310 along a first direction 90 making an oblique angle (α) with the mating direction 91. In some aspects, the resilient member 20 may extend along a second direction 90. The resilient member 20 may be resiliently deformed along the second direction 90 when the optical ferrule 30 mates with a mating optical ferrule 310.

In other aspects, the light redirecting side is configured to change the direction of the light received from an optical waveguide 50 received and secured in the attachment area 40 from a second direction (x-axis) to a substantially perpendicular third direction (z-axis). The second direction (x-axis) may be substantially parallel to the mating direction 91. In some embodiments, the attachment area extends along the second direction (x-axis) making an oblique angle (α) with a first direction 90.

In some aspects, the oblique angle (α) may be about 20 degrees to about 70 degrees. In some other embodiments, the oblique angle (α) may be between about 30 degrees to about 60 degrees, or between 50 degrees to 65 degrees.

In some aspects, the resilient member 20 may include a spring. In some other embodiments, the resilient member 20 may be elastic materials such as rubbers, or magnetic elements, or electrostatic elements, etc. In some embodiments, the resiliently deformed resilient member makes contact with, and applies the force to, a top major surface 31 of the optical ferrule 30. In some aspects, the optical ferrule 30 includes a mating end 32 and an opposite rear end 33. The resiliently deformed resilient member 20 makes contact with, and applies the force to, a region 34 of the optical ferrule disposed between the light redirecting side 60 and the mating end 32 of the optical ferrule.

In some aspects, the light redirecting side is configured to change the direction of the light received from an optical waveguide 50 received and secured in the attachment area 40 by at least 45 degrees, or at least 60 degrees. In some aspects, the light redirecting side 60 is configured to change the direction of the light 70 received from an optical waveguide 50 received and secured in an attachment area 40 primarily by total internal reflection (TIR). In some embodiments, light redirecting elements 65 in the light redirection side 60 may include a reflective coating, for example, or otherwise be made reflective.

In other embodiments, the optical ferrule 130 includes opposing first 35 and second 36 arms integrally formed with, and extending from, opposing respective first 131 and second 132 sides of the optical ferrule in a direction (y-axis) substantially perpendicular to the respective first and second sides and a mating direction (x-axis) of the optical ferrule. The optical connector 200 includes a pair of first resilient members 120 contacting the first arm 35 and a pair of second resilient members 121 contacting the second arm 36. When the optical connector 200 mates with an optical mating connector 300 including a mating optical ferrule 310 assembled thereto, and the optical ferrule mates with the mating optical ferule, at least one first resilient member 120 and at least one second resilient member 121 are resiliently deformed to produce resiliently forces urging the optical ferrule 130 against the mating optical ferrule 310 along the first direction.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific Embodiments shown and described without departing from the scope of the present disclosure. This application is intended to cover any adaptations or variations of the specific Embodiments discussed herein. Therefore, it is intended that this disclosure be limited only by the claims and the equivalents thereof.

The invention claimed is:

1. An optical connector, comprising:
a housing comprising a resilient member; and
an optical ferrule assembled to the housing and comprising:
a plurality of attachment areas for receiving and securing a plurality of optical waveguides; and
a light redirecting side for changing a direction of light received from an optical waveguide received and secured in an attachment area, such that when an optical waveguide is received and secured in any of the attachment areas and light from the optical waveguide propagates along an optical path, the resilient member is not in the optical path, and
such that when the optical connector mates with an optical mating connector comprising an optical mating ferrule assembled thereto, and the optical ferrule mates with the mating optical ferule, the resilient member is resiliently deformed to resiliently force the optical ferrule against the mating optical ferrule;
wherein the resiliently deformed resilient member makes contact with, and applies the force to, a first arm of the optical ferrule integrally formed with, and extending from, a first side of the optical ferrule in a direction substantially perpendicular to the first side and a mating direction of the optical ferrule.

2. The optical connector of claim 1, wherein the resiliently deformed resilient member applies the resilient force to the optical ferule along a first direction making an oblique angle with a mating direction of the optical ferule.

3. The optical connector of claim 1, wherein the light redirecting side is configured to change the direction of the light received from an optical waveguide received and secured in the attachment area by at least 45 degrees, and wherein each attachment area extends along a first direction, and the resiliently deformed resilient member is configured to apply the resilient force to the optical ferule along a second direction making an oblique angle with the first direction.

4. The optical connector of claim 1, wherein the resilient member extends along a first direction, and wherein when the optical ferrule mates with a mating optical ferule, the resilient member is resiliently deformed along the first direction, and wherein the resilient member is attached to a first coupling end attached to the housing and an opposite second coupling end for making contact with the optical ferrule.

5. The optical connector of claim 1, wherein the optical ferrule comprises opposing first and second arms integrally formed with, and extending from, opposing respective first and second sides of the optical ferrule in a direction substantially perpendicular to the respective first and second sides and a mating direction of the optical ferrule, and wherein the optical connector comprises a pair of first resilient members contacting the first arm and a pair of second resilient members contacting the second arm, such that when the optical connector mates with an optical mating connector comprising a mating optical ferrule assembled thereto, and the optical ferrule mates with the mating optical ferule, at least one first resilient member and at least one second resilient member are resiliently deformed to resiliently force the optical ferrule against the mating optical ferrule, wherein the first resilient members contact opposite sides of the first arm, and the second resilient members contact opposite sides of the second arm, wherein for each of the first and second resilient members, one end of the resilient member makes contact with the respective arm of the ferrule, and an opposing end of the resilient member makes contact with the housing of the optical connector, and wherein the resiliently deformed resilient member applies the resilient force to the optical ferule along a first direction making an oblique angle with a mating direction of the optical ferule.

6. An optical connector, comprising:
a resilient member; and
an optical ferrule comprising:
an attachment area for receiving and securing an optical waveguide; and
a light redirecting side for changing a direction of light received from an optical waveguide received and secured in the attachment area, the light propagating along an optical path not intersecting the resilient member,
such that when the optical ferrule mates with an optical mating ferrule along a mating direction, the resilient member is resiliently deformed to produce a resilient force urging the optical ferrule against the mating optical ferrule along a first direction making an oblique angle with the mating direction, wherein the oblique angle is between about 20 to about 70 degrees;
wherein the optical ferrule comprises opposing first and second arms integrally formed with, and extending from, opposing respective first and second sides of the optical ferrule in a direction substantially perpendicular to the respective first and second sides and the mating direction of the optical ferrule, and wherein the optical connector comprises a pair of first resilient members contacting the first arm and a pair of second resilient members contacting the second arm, such that when the optical connector mates with an optical mating connector comprising a mating optical ferrule assembled thereto, and the optical ferrule mates with the mating optical ferule, at least one first resilient member and at least one second resilient member are resiliently deformed to produce resilient forces urging the optical ferrule against the mating optical ferrule along the first direction, wherein the first resilient members contact opposite sides of the first arm, and the second resilient members contact opposite sides of the second arm, and wherein for each of the first and second resilient members, one end of the resilient member makes contact with the respective arm of the ferrule, and an opposite end of the resilient member makes contact with the housing of the optical connector.

7. The optical connector of claim 6, wherein the attachment area extends along a second direction making an oblique angle with the first direction, and wherein the resilient member extends along a second direction, and wherein when the optical ferrule mates with a mating optical ferule, the resilient member is resiliently deformed along the second direction.

8. An optical ferrule comprising:
a plurality of attachment areas for receiving and securing a plurality of optical waveguides;
a light redirecting side for changing a direction of light received from an optical waveguide received and secured in an attachment area by at least 45 degrees;
opposing first and second arms integrally formed with, and extending from, opposing respective first and second sides of the optical ferrule in a direction substantially perpendicular to the respective first and second sides and the mating direction of the optical ferrule; and
a pair of first resilient members contacting the first arm and a pair of second resilient members contacting the second arm, wherein when the optical ferrule mates with a mating optical ferrule, at least one first resilient member and at least one second resilient member are resiliently deformed to resiliently force the optical ferrule against the mating optical ferrule.

9. The optical ferrule of claim 8, wherein each of the first and second arms has a circular, an oval, or a trapezoidal cross-section.

10. The optical ferrule of claim 8 having a unitary construction.

* * * * *

UNITED STATES PATENT AND TRADEMARK OFFICE
CERTIFICATE OF CORRECTION

PATENT NO. : 11,237,340 B2
APPLICATION NO. : 16/822269
DATED : February 1, 2022
INVENTOR(S) : Changbao Ma et al.

Page 1 of 1

It is certified that error appears in the above-identified patent and that said Letters Patent is hereby corrected as shown below:

In the Claims

Column 8
Line 17, In Claim 1, delete "an optical waveguide" and insert -- the optical waveguide --, therefor.
Line 25, In Claim 1, delete "ferule" and insert -- ferrule --, therefor.
Lines 36 & 37, In Claim 2, delete "ferule" and insert -- ferrule --, therefor.
Line 40, In Claim 3, delete "an optical waveguide" and insert -- the optical waveguide --, therefor.
Line 44, In Claim 3, delete "ferule" and insert -- ferrule --, therefor.
Line 49, In Claim 4, delete "a mating optical ferule" and insert -- the mating optical --, therefor.
Lines 64 & 65, In Claim 5, delete "an optical mating connector" and insert -- the optical mating connector --, therefor.
Line 65, In Claim 5, delete "a mating optical ferule" and insert -- the mating optical ferrule --, therefor.
Line 67, In Claim 5, delete "ferule" and insert -- ferrule --, therefor.

Column 9
Line 11 & 13, In Claim 5, delete "ferule" and insert -- ferrule --, therefor.

Signed and Sealed this
Twenty-second Day of November, 2022

Katherine Kelly Vidal
*Director of the United States Patent and Trademark Office*